Patented May 21, 1940

2,201,663

UNITED STATES PATENT OFFICE 2,201,663

XANTHATE OF CELLULOSE GLYCOLLIC ACID

Deane C. Ellsworth, deceased, late of Wilmington, Del., by Joseph F. Haskins, administrator, Wilmington, Del., and Ferdinand Schulze, Waynesboro, Va., assignors to E. I. du Pont de Nemours & Company, Wilmington, Del., a corporation of Delaware No Drawing. Application September 7, 1933, Serial No. 688,434

2 Claims. (Cl. 260—226)

This invention relates to xanthates of cellulose ethers and more particularly to xanthates of cellulose ethers wherein the cellulose is etherified only partially and that by means of a hydroxy acid.

The xanthation of cellulose by means of carbon disulfide in the presence of alkali and the use of solutions of the products thus obtained for the preparation of films, threads and the like, is well known. Many variations in the technique of the preparation of the solution and the coagulation thereof for the regeneration of the cellulose in the form of bands and threads are likewise known.

This invention has as an object the provision of a process whereby xanthates of cellulose ethers of hydroxy acids are obtained. A further object is the preparation of threads, films, and the like, by the coagulation of solutions of the xanthated cellulose ethers of hydroxy acids. Other objects will appear hereinafter.

These objects are accomplished by the following invention wherein a cellulose ether of a hydroxy acid is reacted with carbon disulfiide in the presence of alkali, the solution of the resulting product being coagulable to form new cellulosic structures of considerable utility.

In the following the invention will be discussed with reference to one of its preferred embodiments, namely the xanthation of cellulose glycollic acid. By partially substituting cellulose with the $CH_2CO_2Na$ group and then xanthating, a xanthate of a modified cellulose is secured which has excellent solubility and gives solutions suitable for spinning. On coagulation of such solutions and regeneration of the cellulose derivative in coagulating and regenerating baths of the types used in the viscose industry, there are obtained threads or films of a partially substituted cellulose differing in hygroscopicity, softness, thread lustre, elasticity, shrinkage, and deformation with changes in humidity from the films or threads made from regenerated cellulose.

In a preferred embodiment of the invention, a partially substituted cellulose glycollic acid made by the action of, for example 0.25 to 0.5 mole of sodium chloroacetate, is treated with carbon disulfide in the presence of caustic alkali, the resulting xanthate being then dissolved in dilute caustic alkali and the solution so obtained formed into films or threads, coagulated, washed, and dried in the usual manner.

The following examples are illustrative of the process:

Example I

Ninety-four parts of wood pulp were steeped in 1000 parts of 18% sodium hydroxide solution for one hour at 25° C., pressed to 235 parts and shredded. After aging for 24 hours at 25° C. in a closed container the alkali cellulose was placed in a shredder and 15 parts of dry sodium chloroacetate added. The mass was shredded for one hour at 25° C. and the temperature then raised to 40° C. for 5 hours. The resulting cellulose ether contained approximately one-tenth mol of glycollic acid substituent per glucose unit of the cellulose.

One hundred thirty three parts of the resulting material were placed in a bottle and 16 parts of carbon disulfide added. This was kept at 25° C. for 14 hours. The resulting xanthate was mixed with 450 parts of a 2.44% solution of sodium hydroxide and stirred for 2½ hours. After three days ripening at 18° C. the viscose was cast into sheets on glass plates, dipped into warm 18% ammonium sulfate solution and then into a solution of 18% sodium sulfate and 13% sulfuric acid. After washing the resulting sheets they were dipped into 4% glycerol and dried.

Example II

A solution of xanthated low substituted cellulose glycollic acid prepared as above is forced through a spinnerette into a coagulating and regenerating bath such as is used in the viscose industry. The resulting filaments are passed through the bath and taken upon a bobbin at a speed measurably greater than the speed of emergence from the spinnerette. The resulting thread is washed and dried by suitable means.

The process has been described in terms of cellulose glycollic acid but its analogs and homologs such as cellulose-oxypropionic acid, alpha cellulose-oxycaproic acid, alpha cellulose-oxymargaric acid, alpha cellulose-oxystearic acid, cellulose-oxysuccinic acid, cellulose-oxymalonic acid, cellulose glyceric acid, and the like may be employed. As starting material for the preparation of the partially substituted cellulose ether of the hydroxy fatty acid, for example cellulose glycollic acid, prior to xanthation, any of the varieties of cellulose may be used but it is preferred to use a relatively high viscosity cellulose and to use as mild conditions in this step as possible. Instead of sodium chloroacetate, other sodium salts of halogenated fatty acids may be employed, such as sodium salts of alpha chloropropionic, beta chloropropionic, alpha bromocaproic, alpha bromomargaric, alpha chlorostearic, chlorosuccinic, bromomalonic, or alpha chloro beta hydroxypropionic. In general, any cellulose ether of the formula cellulose —O—R—CO₂H having a reactive hydroxyl group of the cellulose nucleus wherein R is a divalent organic open chain radical may be employed. The open chain radical R may have aromatic substituents as in the case of the cellulose ether of mandelic acid

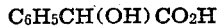

$$C_6H_5CH(OH)CO_2H$$

The radical R may be unsaturated as in the case of the cellulose ether of ricinoleic acid. The degree of substitution may range from that secured for example by the use of ⅛ of a mole of chloroacetic acid on alkali cellulose to as high as 1½ moles, that is, a degree of substitution of from approximately 1/16th to approximately ¾ mole of $CH_2CO_2Na$ radical per glucose unit of the cellulose molecular. The xanthates of the present invention are therefore of ethers containing less than 1 mole of substituent per glucose unit. Less than ½ mole per glucose unit is preferred. It is desirable to use relatively small amounts of chloroacetic acid in the formation of the glycollic acid ether of cellulose, since when larger amounts are used the films or threads formed by coagulating the xanthate are more water sensitive than is in general desired. In certain cases the xanthates of the higher substituted cellulose glycollic acids are so soluble in water that coagulation is difficult. These solutions, however, may be employed for certain types of coating compositions. In the case of the cellulose ethers of higher hydroxy acids this water sensitivity is not so marked and a somewhat greater tolerance of degree of substitution is allowed.

In xanthating the usual xanthating processes are used. It is desirable in certain cases to use relatively smaller amounts of carbon disulfide than are used in the xanthation of cellulose. Cooling the mixture at some stage in the process particularly during the step of dissolving the xanthate is also desirable. This may or may not be combined with the preceding. The time of ripening the xanthate may be varied and can best be determined by coagulating small samples and testing the films or threads formed. No definite salt index can be set since the optimum varies with the amount and kind of substituent hydroxy acid. The details of the spinning or film casting processes vary with the amount of substituent hydroxy acid but can be readily determined in a specific case by one skilled in the art.

Films formed by coagulation of the xanthates of low substituted cellulose glycollic acids or of other low substituted cellulose ethers of fatty acids may be softened by any of the softeners ordinarily used with regenerated cellulose and may be coated with moistureproofing compositions. By "low substituted" is meant a degree of substitution of less than 1 mole of substituent per glucose unit of the cellulose molecule.

Solutions of xanthated cellulose ethers of fatty acids and in particular solutions of xanthated cellulose glycollic acids may be used in the preparation of films or filaments or as sizing materials, etc., in much the same way as ordinary viscose but offer advantages thereover in the variation of the characteristics of softness, elasticity, shrinkage, dyeing properties, etc. Solutions of xanthates of cellulose ethers of hydroxy acids may be used in mixture with ordinary viscose to impart to the latter more or less of a variation in the above mentioned characteristics.

In the claims the radical $RCO_2H$ or $CH_2CO_2H$ is equivalent to $RCO_2$ alkali metal or $CH_2CO_2$ alkali metal.

As many apparently widely different embodiments of this invention may be made without departing from the spirit and scope thereof, it is to be understood that we do not limit ourselves to the specific embodiments thereof except as defined in the appended claims.

It is claimed:

1. The xanthate obtained by steeping 94 parts of wood pulp in 1,000 parts of 18% sodium hydroxide solution for one hour at 25° C., pressing to 235 parts, shredding, aging for 24 hours at 25° C. in a closed container, shredding the resultant with 15 parts of dry sodium chloroacetate for one hour at 25° C., followed by shredding for 5 hours at 40° C., treating the resultant with carbon disulfide in the proportion of 16 parts of carbon disulfide for each 133 parts of the cellulosic body, and holding the resultant mixture at 25° C. for 14 hours.

2. The process which comprises steeping 94 parts of wood pulp in 1,000 parts of 18% sodium hydroxide solution for one hour at 25° C., pressing to 235 parts, shredding, aging for 24 hours at 25° C. in a closed container, shredding the resultant with 15 parts of dry sodium chloroacetate for one hour at 25° C., followed by shredding for 5 hours at 40° C., treating the resultant with carbon disulfide in the proportion of 16 parts of carbon disulfide for each 133 parts of the cellulosic body, and holding the resultant mixture at 25° C. for 14 hours.

JOSEPH F. HASKINS,
*Administrator of the Estate of Deane C. Ellsworth, Deceased.*
FERDINAND SCHULZE.